UNITED STATES PATENT OFFICE.

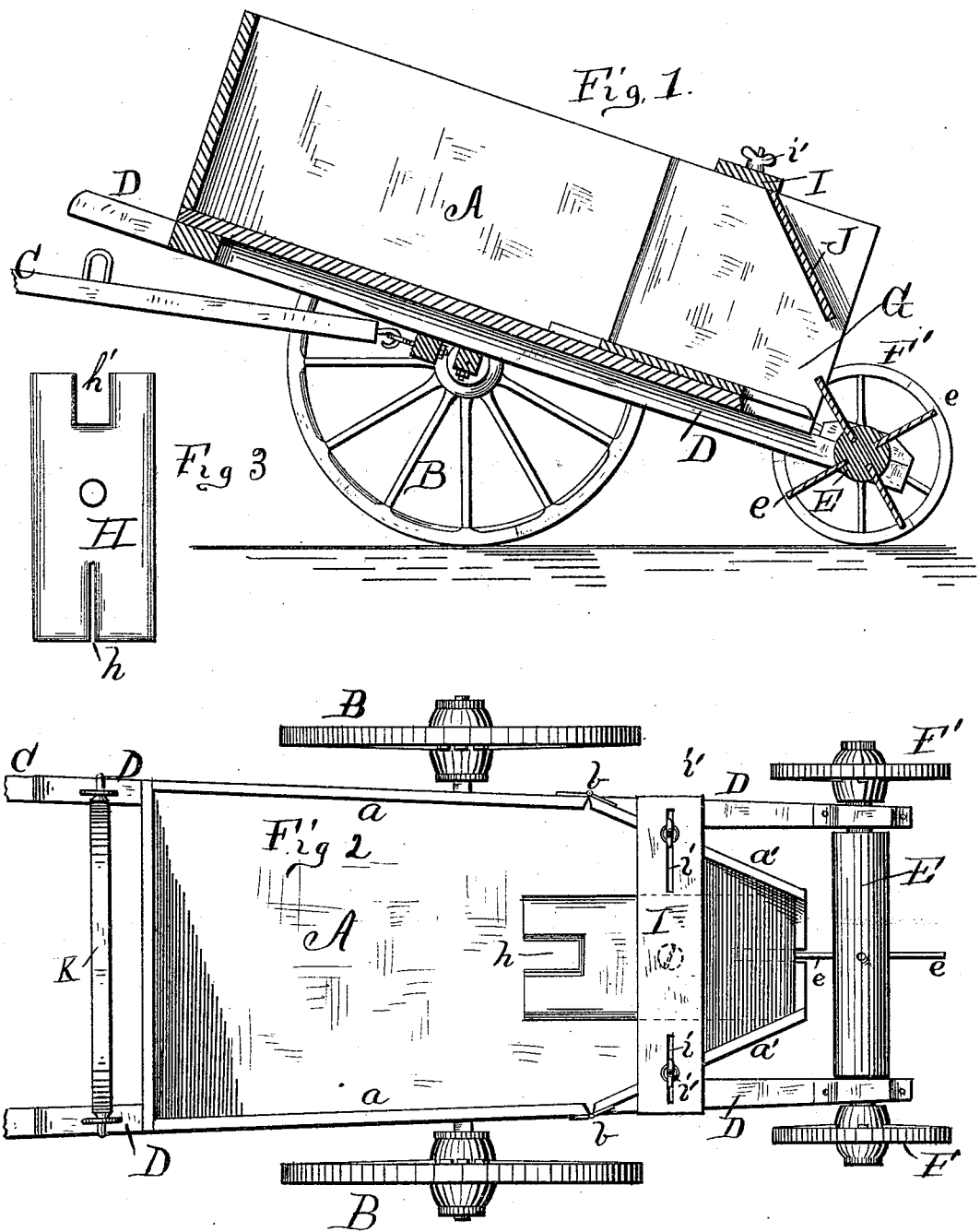

EBENEZER PRICE, OF WINDSOR, NORTH CAROLINA.

MANURE-DUMPING CART.

SPECIFICATION forming part of Letters Patent No. 250,282, dated November 29, 1881.

Application filed September 12, 1881. (No model.)

*To all whom it may concern:*

Be it known that I, EBENEZER PRICE, a citizen of the United States of America, residing at Windsor, in the county of Bertie and State of North Carolina, have invented certain new and useful Improvements in Manure-Dumping Carts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a side elevation, partly in section; Fig. 2, a top-plan view, and Fig. 3 a detached view of the reversible throat-plate.

This invention has relation to carts for hauling and spreading manure and the like; and the novelty consists in the construction and operation of the same, as will be hereinafter more fully described, and particularly pointed out in the claims.

In the accompanying drawings similar letters of reference marked thereon indicate like parts of the invention.

A represents a box-cart of a suitable size, provided with ordinary wheels and shafts B C. The bottom rails, D, of the body A extend a sufficient distance beyond the rear end of the cart to form bearings for the shaft E, which is provided on its outer ends with two small wheels, F and F', and about the center of the length of the shaft E is a series of radial arms or teeth, e. The sides a of the body A are approximately parallel and rigid for about two-thirds of their distance from the front end, and the rest of the distance they are adjustable, as shown by the letter a', and are hinged to a by the hinges b.

A cross-piece, I, provided with slots i is adjustably secured to the tops of the hinged sides a' by the thumb-screws i', so that the sides a' may be brought closer together or separated, thereby regulating the size of the opening G to any desired size.

A throat-plate, H, provided with different-sized slots h h', is removably secured to the bottom of the body A at its rear end and between the hinged sides a', and a fender, J, is attached to the cross-piece I, projecting downward.

In operation, the cart is filled with manure or fertilizer of any kind. The yoke K being in position, the cart is level and the wheels F F' are off the ground. In this condition the cart and contents are taken to the place where it is desired to spread the contents and the yoke K removed. This allows the body of the cart to tilt backward till the wheels F F' bear upon the ground. The cart is then drawn along, and the contents, sliding into the contracted opening G, are forced downwardly and out through the slots h or h' in the throat-plate H by means of the radial arms e, which, in revolving, pass through it.

By reversing the throat-plate H and enlarging or contracting the opening G, by means of the adjustable sides a' and thumb-screws i', different kinds of fertilizer may be distributed, and a greater or less quantity spread, as may be desirable, and by throwing the sides a' open to their full extent the whole load may be discharged, if necessary.

Having thus fully described my invention, what I claim as new and useful, and desire to secure by Letters Patent, is—

1. In a cart adapted to spread fertilizer, the body A, provided with the adjustable sides a', cross-piece I, having slots i and screws i', in combination with the extended side rails, D, carrying the shaft E, provided with the wheels F F' and radial arms e, substantially as and for the purpose set forth.

2. In a dumping-cart, the body A, sides a', cross-piece I i, thumb-screws i', and reversible throat-plate H, having slots h h', in combination with the shaft E, wheels F F', and arms e, substantially as and for the purpose set forth.

In testimony whereof I affix my signature in presence of two witnesses.

EBENEZER PRICE.

Witnesses:
HENRY C. FAGER,
I. A. GRANT.